United States Patent
Lee et al.

(10) Patent No.: US 12,536,813 B2
(45) Date of Patent: Jan. 27, 2026

(54) METHOD FOR RECOGNIZING ANOMALOUS LANE LINE AND ELECTRONIC DEVICE

(71) Applicant: HON HAI PRECISION INDUSTRY CO., LTD., New Taipei (TW)

(72) Inventors: Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 445 days.

(21) Appl. No.: 18/114,929

(22) Filed: Feb. 27, 2023

(65) Prior Publication Data

US 2024/0177496 A1    May 30, 2024

(30) Foreign Application Priority Data

Nov. 30, 2022   (CN) .......................... 202211529892.5

(51) Int. Cl.
*G06V 20/56*   (2022.01)
*G06T 7/70*    (2017.01)

(52) U.S. Cl.
CPC .............. *G06V 20/588* (2022.01); *G06T 7/70* (2017.01); *G06T 2207/30256* (2013.01)

(58) Field of Classification Search
CPC ...... G06V 20/588; G06V 10/764; G06T 7/70; G06T 2207/30256
See application file for complete search history.

(56) References Cited

U.S. PATENT DOCUMENTS

| | | | |
|---|---|---|---|
| 2005/0265579 A1* | 12/2005 | Nishida | G08G 1/0962 382/104 |
| 2015/0248588 A1* | 9/2015 | Ishigami | G06T 7/60 382/104 |
| 2019/0243372 A1* | 8/2019 | Huval | G05D 1/0221 |
| 2023/0034574 A1* | 2/2023 | Xie | G01C 21/26 |

* cited by examiner

*Primary Examiner* — Stephen R Koziol
*Assistant Examiner* — Michael Kim Maiden
(74) *Attorney, Agent, or Firm* — ScienBiziP, P.C.

(57) ABSTRACT

The present disclosure relates to a field of intelligent driving technology field, and provides a method for recognizing anomalous lane line and an electronic device obtaining lane line recognition results of lane line images. The method includes: determining lane lines in the lane line images according to the lane line recognition results; determining one of the lane lines having a length greater than a first length threshold and having a straight line from the lane lines as the first lane line; masking the first lane line and determining mark points of the first lane; determining marking lines according to the mark points and the first lane line; dividing each of the lane line images according to the marking lines and obtaining a lane spacing area; and determining the lane lines in the lane spacing area of the lane line recognition results as abnormal lane lines.

18 Claims, 5 Drawing Sheets

METHOD FOR RECOGNIZING ANOMALOUS LANE LINE AND ELECTRONIC DEVICE

This application claims priority to Chinese Patent Application No. 202211529892.5 filed on Nov. 30, 2022, in China National Intellectual Property Administration, the contents of which are incorporated by reference herein.

FIELD

The subject matter herein generally relates to a field of intelligent driving technology field, in particular, relates to a method for recognizing anomalous lane line and an electronic device.

BACKGROUND

During a driving process of a vehicle, a vehicle system in an intelligent mode will detect lane lines in a road, that is, lane line recognition, and then the vehicle will control or assist a driving of the vehicle based on recognized lane lines and enabled functions. The lane line recognition has become an indispensable technology for autonomous driving vehicles. In a lane-level positioning technology, or an avoidance based on traffic rules and a local planning, there are high requirements for the accuracy of the lane line recognition. Results of the lane line recognition are generally obtained by a recognition device installed at the end of the vehicle processing image information obtained by the vehicle during the driving process.

At present, the image algorithms often adopt deep learning schemes based on neural networks. In addition to the lane lines, there may also be road signs in the image information obtained by the vehicle during the driving process, such as road indication arrows, speed limit signs, etc. In a process of lane line detection by using graphic algorithms, it is easy to misidentify the road signs as the lane lines, resulting in low accuracy of the lane line recognition.

BRIEF DESCRIPTION OF THE DRAWINGS

Implementations of the present disclosure will now be described, by way of embodiment, with reference to the attached figures.

DETAILED DESCRIPTION

The terms "first" and "second" are used for descriptive purposes only, and cannot be understood as indicating or implying relative importance or implicitly specifying the quantity of indicated technical features. Thus, a feature defined as "first" and "second" may explicitly or implicitly include one or more of these features. In the description of the embodiments of the present disclosure, words such as "exemplary", "or", and "for example" are used as examples, illustrations or illustrations. Any embodiment or design solution described as "exemplary" or "for example" in the embodiments of the present disclosure shall not be interpreted as being more preferred or more advantageous than other embodiments or design solutions. Rather, a use of words such as "exemplary", "or", "such as" is intended to present concepts in a concrete manner.

Unless otherwise defined, all technical and scientific terms used herein have a same meaning as commonly understood by one of ordinary skill in the technical field of this disclosure. The terms used in the description of the present disclosure are only for the purpose of describing specific embodiments, and are not intended to limit the present disclosure. The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

During a driving process of a vehicle, a vehicle system in an intelligent mode will detect lane lines in a road, that is, lane line recognition, and then the vehicle will control or assist a driving of the vehicle based on recognized lane lines and enabled functions. The lane line recognition has become an indispensable technology for autonomous driving vehicles. In a lane-level positioning technology, or an avoidance based on traffic rules and a local planning, there are high requirements for the accuracy of the lane line recognition. Results of the lane line recognition are generally obtained by a recognition device installed at the end of the vehicle processing image information obtained by the vehicle during the driving process.

At present, the image algorithms often adopt deep learning schemes based on neural networks. In addition to the lane lines, there may also be road signs in the image information obtained by the vehicle during the driving process, such as road indication arrows, speed limit signs, etc. In a process of lane line detection by using graphic algorithms, it is easy to misidentify the road signs as the lane lines, resulting in a low accuracy of the lane line recognition. In order to improve the accuracy of lane lines recognition, embodiments of the present disclosure provide a method for recognizing anomalous lane line, an electronic equipment, and a computer-readable storage medium. The method for recognizing anomalous lane line can be applied in the electronic device.

The electronic device in the embodiment of the present disclosure may be a vehicle-mounted device, a mobile phone, a tablet computer, a desktop computer, a laptop computer, a handheld computer, a notebook computer, an ultra-mobile personal computer (UMPC), a netbook, and a cellular phone, a personal digital assistant (PDA), an artificial intelligence (AI) device, a wearable device, a smart home device, and/or a smart city device, or other electronic device. The embodiments of the present disclosure do not impose special restrictions on the specific form of the electronic device. In one embodiment, a network connected to the electronic device includes, but is not limited to, the Internet, a wide area network, a metropolitan area network, a local area network, and a Virtual Private Network (VPN).

Figure 1:
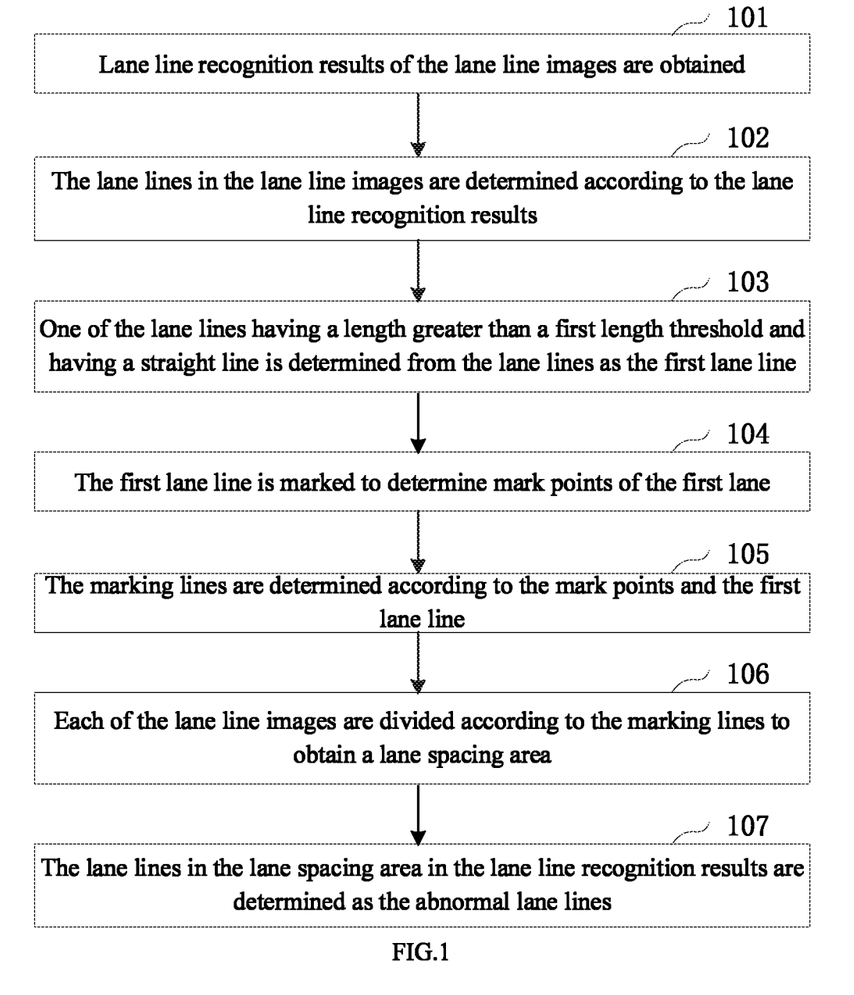
FIG. 1 is a flowchart of one embodiment of a method for recognizing anomalous lane line.

In order to make a purpose, a technical solution and an advantage of the method provided by the embodiment of the present disclosure clearer, the method will be described in detail below in conjunction with the accompanying drawings and specific embodiments Refers to FIG. 1, FIG. 1 illustrates a flowchart of one embodiment of the method for recognizing anomalous lane line.

The method for recognizing anomalous lane line can be applied in a device for detecting lane line, the device for detecting lane line can be mounted on a mobile device, and has a data connection with the mobile device. In one embodiment, the mobile device may be some mobile devices capable of driving on public transportation roads, such as a self-driving vehicle. The device for detecting lane line can also be an auxiliary driving device that has a data connection with the mobile device.

In one embodiment, the device for detecting lane line can be integrated into the mobile device, such as a system in which the mobile device is integrated into the mobile device. In another embodiment, the device for detecting lane line can be connected externally to the mobile device, such as an auxiliary driving device connected to the mobile device.

Figure 2:
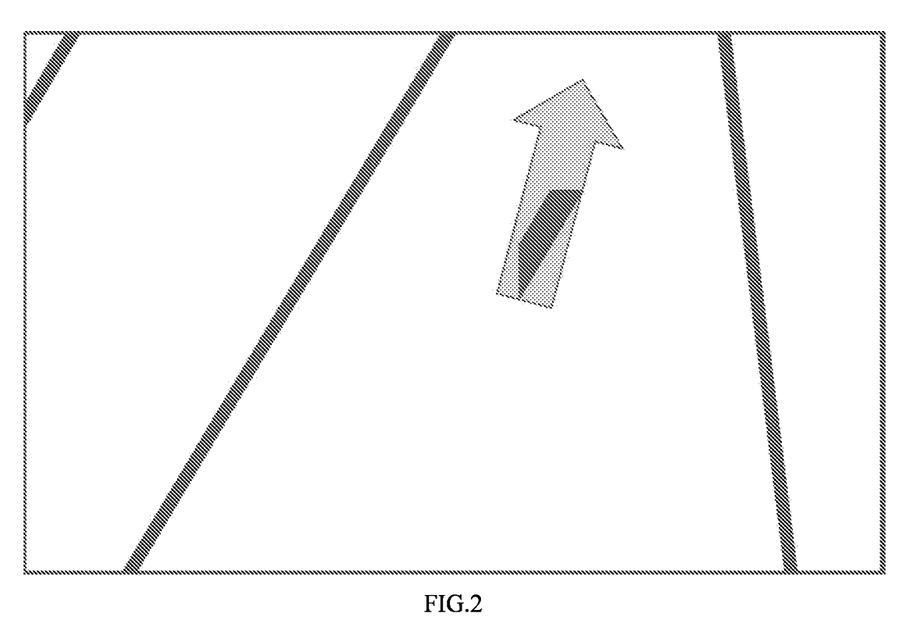
FIG. 2 is a scene diagram of one embodiment of detecting lane lines.

FIG. 2 illustrates a scene diagram of detecting lane lines. In one embodiment, the method for recognizing anomalous lane line can be applied in a scene of detecting lane lines, as shown in FIG. 2. In one embodiment, the mobile device 10 may be a vehicle driving on a public transportation road, and the device 100 for detecting lane line is built in the mobile device 10. In one embodiment, one or more sensors 101 are also installed on the mobile device 10. The device 100 for detecting lane line can obtain environment images, such as lane line images of the mobile device 10 by the sensors 101. The sensor 101 includes a vision sensor, and the vision sensor is used to obtain environment images around the mobile device 10. In one embodiment, the sensors 101 can be arranged at positions such as a front, a rear and/or a roof of the mobile device 10, and one or more sensors 101 arranged in the mobile device 10 can be arranged at the same position or at different positions, which is not limited in the embodiments of the present disclosure. The sensor 101 can collect the environment images of a preset range around the mobile device. The environment images can be collected in real time or according to a preset period. A local map of the environment where the mobile device is located can be constructed based on the environment images. In one embodiment, images in front of the mobile device 10 can be obtained by the sensor 101, and the images in front of the mobile device 10 can be called front views, and image points of the lane lines in the front views can be recognized based on an image model. In one embodiment, a pose information and a three dimensional (3D) environment information of the mobile device 10 are combined to transform the image points of the lane lines into a local map in a world coordinate system, and the local map of the environment where the mobile device 10 is located is obtained, and positions of the lane lines corresponding to the image points of the lane lines in the local map are determined.

In one embodiment, the device 100 for detecting lane line includes a processor. the processor can recognizes the lane lines from the lane line images obtained by the sensor 101, recognizing the lane lines and road signs in the lane line images, and obtain the lane line recognition result corresponding to the lane line images. In one embodiment, convolutional neural networks (CNN) can be used for detecting the lane lines.

The method for detecting anomalous lane line provided by the embodiment of the present disclosure can be applied to an intelligent driving platform. The intelligent driving platform collects information such as surfaces and road conditions of various roads, and recognizes and filters abnormal information or wrong information in the collected information, so as to provide a route planning, a map navigation and other functions for different vehicles.

Specifically, in connection with present disclosure, the intelligent driving platform can identify abnormal lane lines in various lanes, thereby avoiding determining non-lane road traces (such as road stains, road markings, etc.) as the lane lines, therefore correctly planning a path for the vehicle, and improving driving safety.

Refers to FIG. 1, the method for detecting anomalous lane line includes block S11 to block 17.

At block 11, lane line recognition results of the lane line images are obtained.

In one embodiment, the lane line recognition results include lane line data of the lane lines and road sign data of road signs. A position information of the lane lines in the lane line images can be determined according to the lane line data. A position information of the road signs in the lane line images can be determined according to the road sign data.

At block 12, the lane lines in the lane line images are determined according to the lane line recognition results.

In one embodiment, the lane line recognition results include length data of the lane line, and the length data can determine length of the lane lines. In order to avoid determining pavement traces of the non-lane line having similar shape with the shapes of the lane line as the lane lines, a first length threshold can be set in advance and the first length threshold is used to verify the lane lines. In one embodiment, if the length of a determined lane line is greater than the first length threshold, it is determined that the determined lane line is more likely to be a lane line. If the length of a determined lane line is equal to or less than the first length threshold, it is determined that the recognition result is wrong, and the determined lane line is not a lane line. In the embodiment of the present disclosure, based on marking lines perpendicular to the lane lines, it is necessary to determine the marking lines on the basis of the straight lane lines to detect road traces that are incorrectly marked as lane lines. Therefore, it is necessary to determine whether the lane lines recognized by the lane line recognition results is the straight line.

Figure 3A:
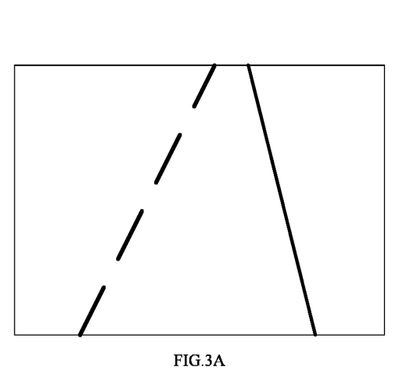
FIG. 3A is a scene diagram of one embodiment of filling dashed lane lines.
Figure 3B:
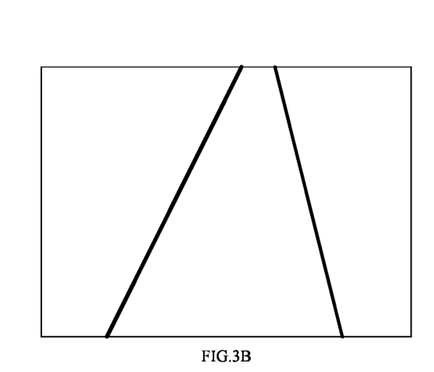
FIG. 3B is a scene diagram of another embodiment of filling dashed lane lines.

In one embodiment, the lane lines in lane line images may be dashed lane lines. In one embodiment, in order to improve a processing efficiency of the dashed lane lines, the dashed lane lines can be filled to obtain solid lane lines when the lane lines in the lane line images are the dashed lane lines. In one embodiment, the gaps at both ends of the dashed lane line are filled. FIG. 3A-FIG. 3B illustrate scene diagrams of filling the dashed lane lines, FIG. 3A shows one dashed lane line of the dotted lane lines, vacancies at both ends of the dashed lane line are filled to obtain a solid lane line of the dashed lane line after filling, referring to FIG. 3B.

The lane lines determined by the lane line recognition results are traversed in sequence, for determining whether there is a straight lane line with a length greater than a first length threshold from the lane lines. If there is one lane line whose length is greater than the first length threshold and the lane line is a straight line, block 13 is executed.

At block 13, one of the lane lines having a length greater than a first length threshold and having a straight line is determined from the lane lines as the first lane line.

At block 14, the first lane line is marked to determine mark points of the first lane.

In one embodiment, the first lane line is marked to leave a mark point on the first lane line each time, and at least one mark point of the first lane line is determined. If the first lane line is a solid line lane line, the at least one mark point marked on the solid line is a point on the solid line. If the first lane line is a dashed lane line that has not been filled, the at least one mark points marked on the dashed lane line may not be points on the dashed lane line.

In order to make the mark points meet a certain length rule, a target length interval can be preset, and the target length interval is used to mark the first lane line. The target length interval can be a length value preset by a user based on empirical data, or a length value obtained after the user adjusting the target length interval according to actual needs, which is not limited in the embodiment of the present disclosure. For example, the target length interval can be 0.8 m, 1 m, 1.2 m, 1.3 m, 1.4 m, 1.5 m, 1.8 m, 2 m, etc. It can be understood that the target length interval illustrated above is relative to the length interval of the real lane line corresponding to the lane line images. The target length interval may also be set relative to the length interval shown in the lane line images, for example, 3 cm, 5 cm, 8 cm, etc. In one embodiment, making the first lane line to determine the mark points of the first lane, includes: marking the first lane line according to the target length interval, and determining the mark points.

In one embodiment, after selecting any one of the two ends of the first lane line, the first lane line can be marked according to a preset target length interval, and the mark points can be determined on the first lane line. In one embodiment, the lane lines can be close to one end in the same direction, which is not limited here.

In order to ensure a quantity of the mark points on the first lane line, the quantity of the mark points on the first lane line matches a preset quantity. The preset quantity is used to determine the quantity of the mark points. The preset quantity can be a value of the quantity of the preset mark points, that is, the quantity of the mark points is the same as the value of the preset quantity. In one embodiment, preset quantity can also be a minimum threshold of the quantity of the preset mark points, that is, the quantity of the mark points is greater than or equal to the preset quantity. In one embodiment, marking the first lane line according to the target length interval includes: determining the target length interval according to the preset quantity and the length of the first lane line. In one embodiment, a difference after the preset quantity minus one is calculated, and a quotient obtained by dividing the length of the first lane line by the difference is calculated, and the quotient is determined as a value of the target length interval. In one embodiment, the value of the target length interval is equal to or less than the quotient, thus the quantity of the mark points is equal to or greater than the preset quantity.

At block 15, the marking lines are determined according to the mark points and the first lane line.

In one embodiment, the marking lines are lines passing through the mark points. The marking lines are used to verify other lane lines outside the first lane line. Each mark point on the first lane line has corresponding marking line.

In one embodiment, determining the marking lines according to the mark points and the first lane line includes: determining a straight line passing through the mark points and perpendicular to the first lane line as the marking lines, and both ends of each of the marking lines intersecting with two sides of one of the lane line images respectively.

At block 16, each of the lane line images are divided according to the marking lines to obtain a lane spacing area.

In one embodiment, according to the marking lines, adjacent lane lines in the lane line images can be determined. Each of the lane line images are divided according to the adjacent lane lines to obtain the lane spacing area. The lane spacing area is an area between two lane lines.

In one embodiment, dividing each of the lane line images according to the marking lines to obtain the lane spacing area includes: determining a second lane line corresponding to the first lane line according to the marking line; determining an area between the first lane line and the second lane line in each of the lane line images as the lane spacing area. In one embodiment, the second lane line is a lane line adjacent to the first lane line.

Figure 4:
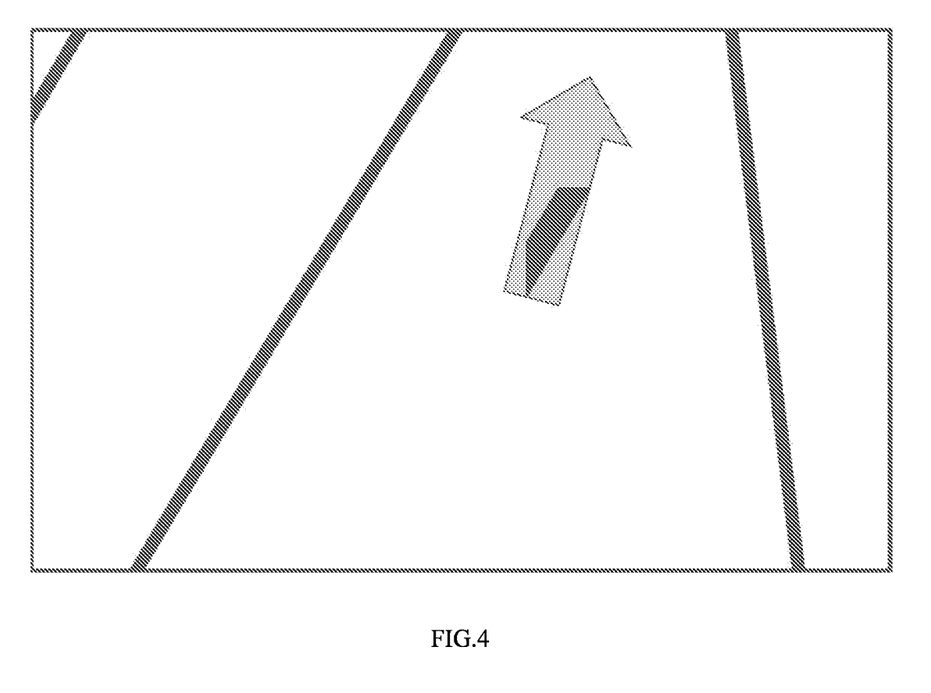
FIG. 4 is a scene diagram of one embodiment of determining a lane spacing area between lanes.

FIG. 4 illustrates a scene diagram of determining a lane spacing area between lanes. In FIG. 4, the first lane line is marked, and the first lane line includes the marking points. The marking lines are determined based on the mark points and the first lane line. A second lane line corresponding to the first lane line is determined according to the marking lines. The area between the first lane line and the second lane line in the lane line images is determined as the lane spacing area, and two lane spacing areas are obtained.

In one embodiment, determining the second lane line corresponding to the first lane line according to the marking lines includes: determining one lane line intersecting the marking lines and adjacent to the first lane line as the second lane line corresponding to the first lane line.

In one embodiment, in order to avoid determining pavement traces of the non-lane lines as the lane lines again, determining one lane line intersecting the marking lines and adjacent to the first lane line as the second lane line corresponding to the first lane line includes: if the lane line intersects the marking lines and is adjacent to the first lane line, determining the length of the lane line; if the length of the lane line is greater than a second length threshold, determining the lane line as the second lane line corresponding to the first lane line. In one embodiment, if the length of the lane line is equal to or less than the second length threshold, it is determined that the lane line has a high probability of being misjudged as a lane line, and may be a road trace of a non-lane line.

There may be adjacent lane lines on both sides of the first lane line. If there are adjacent lane lines on both sides of the first lane line, calculated lane spacing areas may exist a same lane spacing area. In order to avoid a waste of computing power caused by determining the same spacing area, in one embodiment, a target orientation can be set in advance, and the target orientation can be set according to actual situation, which is not limited here. In one embodiment, the target orientation can be a direction such as left or right, or a direction such as east, south, west or north. The second lane line is a lane line located at the target orientation of the first lane line. For example, the second lane line is a lane line located on the left side of the first lane line; or the second lane line is a lane line located on the right side of the first lane line. By setting the target orientation, a situation of determining the calculated lane spacing areas existing a same lane spacing area can be avoided, so that the waste of computing power caused by the same lane spacing area can be determined.

In one embodiment, there should be no lane lines in two adjacent lane lines or in the lane spacing area. Therefore, the lane line recognized from the lane spacing area is an abnormal lane line. The abnormal lane line is a road trace of a non-lane line.

At block 17, the lane lines in the lane spacing area in the lane line recognition results are determined as the abnormal lane lines.

In one embodiment, after the lane lines in the lane spacing area are determined as the abnormal lane lines, the lane line recognition results can be corrected, so that recognition results corresponding to the abnormal lane lines in corrected lane line recognition results are non-lane lines. The above method can filter out incorrectly recognized lane lines in the lane line recognition results, improving the accuracy of lane line detection.

The method for recognizing abnormal lane line provided by the above embodiments can preliminarily determine that there may be abnormal lane lines among the lane lines recognized by the lane line recognition results by performing length detection on the lane lines recognized by the lane line recognition results; and mark the first lane line after performing the length detection to determine the lane spacing area; based on the lane spacing area, further determine the abnormal lane lines in the lane lines recognized by the lane line recognition results, and determines that there may be the abnormal lane lines in the lane line recognition results as much as possible. Therefore, the accuracy of lane line detection is improved, and the safety of vehicle driving is further improved.

When the method for recognizing abnormal lane line provided by the above embodiments is applied to an intelligent driving platform, the abnormal lane lines on each road in the initial lane line recognizing results can be identified, and the abnormal lane lines in the recognizing results can be filtered out, and updated lane line recognition results are stored to plan correct driving paths for different vehicles, so that the vehicle can drive correctly.

In one embodiment, the method for recognizing abnormal lane line can also be applied to a vehicle. A vehicle-mounted system identifies abnormal lane lines or communicates with the cloud server by images obtained by a camera in the vehicle to obtain a calculation of the cloud server and recognition results, so as to determine whether the vehicle recognizes road surface traces of the non-lane line as abnormal lane lines during driving, so as to avoid planning incorrect paths.

The vehicle need not determine the recognition results of all lane lines on the road during driving, but only determines whether there are abnormal lane lines in the lane lines near the current driving lane of the vehicle, and recognizes the abnormal lane lines. For example, when the vehicle is driving in a lane, the lane line having a length greater than the first length threshold and being the closest to the vehicle in the lane lines can be used as the first lane line. According to the first lane line, some specific implementation steps for determining the abnormal lane line can be found in the relevant description of FIG. 1, which will not be repeated here.

In one embodiment, in order to further reduce an amount of calculation of determining abnormal lane lines in the recognition results. The second lane line can be determined based on the lane located by the vehicle, and/or the orientation of the vehicle relative to the first lane line. The second lane line may be a lane line at an orientation of the vehicle relative to the first lane line. For example, the orientation of the vehicle relative to the first lane line is a left side of the first lane line, and the second lane line may be a lane line on the left side of the first lane line. As another example, if a determined first lane line is one of the two lane lines of the lane where the vehicle is located, the second lane line may be the other of the two lane lines of the lane where the vehicle is located. It can be understood that the vehicle is between the determined first lane line and the second lane line. by the above-mentioned embodiments, only the abnormal lane lines in the current lane of the vehicle can be identified and route planned in the current lane of the vehicle can be performed, and there is no need to identify the abnormal lane lines outside the current lane of the vehicle, which can reduce an amount of calculation in a process of identifying the abnormal lane lines.

In one embodiment, when the vehicle recognizes the abnormal lane line, the driving path of the vehicle can be re-planned according to recognized abnormal lane lines to obtain a more accurate path planning and improve the driving safety of the vehicle.

Figure 5:
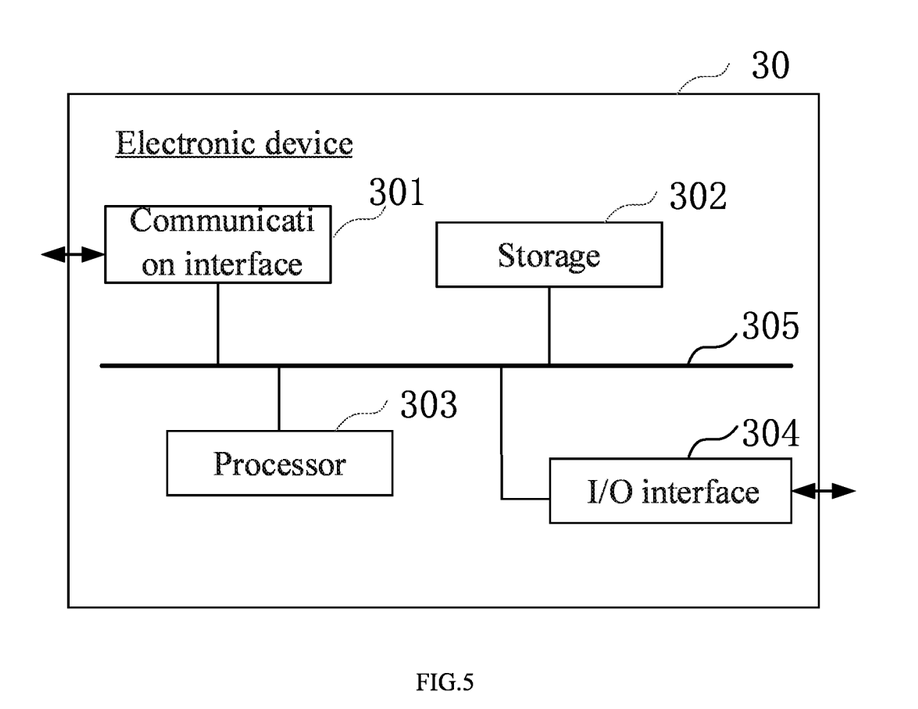
FIG. 5 is a structural diagram of one embodiment of an electronic device performing the method of FIG. 1.

FIG. 5 illustrates a structural diagram of an electronic device. In one embodiment, the electronic device 30 can be a server or a terminal device.

In one embodiment, a network connected with the electronic device 30 includes but is not limited to the Internet, a wide area network, a metropolitan area network, a local area network, and a virtual private network (VPN).

Refers to FIG. 5, the electronic device 30 includes a communication interface 301, a storage 302, a processor 303, an input/output (I/O) interface 304 and a bus 305. The processor 303 is respectively coupled to the communication interface 301, the storage 302, and the I/O interface 304 by the bus 305.

The communication interface 301 is used for communication. The communication interface 301 may be an existing interface on the electronic device 30, or a new interface on the electronic device 30. In one embodiment, the communication interface 301 may be a network interface, such as a wireless local area network (WLAN) interface, a cellular network communication interface or a combination thereof, etc.

The storage 302 can be used to store an operating system and a computer program. For example, the storage 302 stores a program corresponding to the above-mentioned method of recognizing abnormal lane line.

It should be understood that the storage 302 may include an area for storing programs and an area for storing data. The area for storing programs can be used to store the operating system, at least one application program required by the method (such as the method of recognizing abnormal lane line, etc.). The area for storing data can store data created according to the use of the electronic device 30. In one embodiment, the storage 302 may include a volatile memory, and may also include a non-volatile memory, such as a hard disk, an internal memory, a plug-in hard disk, a smart media card (SMC), a secure digital (SD) card, a flash card, at least one disk storage device, a flash memory device, or other storage device.

The processor 303 provides calculation and control capabilities and supports operations of entire computer device. For example, the processor 303 is configured to execute the computer program stored in the storage 302, so as to realize the steps in the above-mentioned method.

In one embodiment, the processor 303 is a central processing unit (CPU), and the processor 303 may also be other general-purpose processor, digital signal processors (DSP), application specific integrated circuits (ASIC), Field-Programmable Gate Array (FPGA) or other programmable logic devices, discrete gate or transistor logic devices, discrete hardware components, etc. In one embodiment, the general-purpose processor can be a microprocessor or the processor can also be any conventional processor.

The I/O interface 304 is used to provide channels for input or output. For example, the I/O interface 304 can be used to connect various input and output devices (mouse, keyboard, or 3D touch device, etc.), a display, so that the user can input information, or visualize information.

The bus 305 is used to provide communication channels of the communication interface 301, the storage 302, the processor 303, and the I/O interface 304 in the electronic device 30.

Those skilled in the art can understand that a structure of the electronic device shown in FIG. 5 is only a block diagram of a partial structure related to the solution of the present disclosure, and does not constitute a limitation to the computer equipment on which the solution of the disclosure is applied. The specific computer equipment may include more or fewer parts than shown in FIG. 5, or some parts of the computer equipment are combined, or the computer equipment has a different part arrangement.

In one embodiment, when the processor 303 executes the computer program stored in the storage 302 to realize the method for recognizing the abnormal lane line, the following steps of the method are implemented: obtaining lane line recognition results of the lane line images; determining the lane lines in the lane line images according to the lane line recognition results; determining a lane line having a length greater than a first length threshold and having a straight line from the lane lines as the first lane line; marking the first lane line to determine mark points of the first lane; determining the marking lines according to the mark points and the first lane line; dividing each of the lane line images according to the marking lines to obtain a lane spacing area; determining the lane lines in the lane spacing area in the lane line recognition results as the abnormal lane lines.

Specifically, a specific implementation method of the above instructions executed by the processor 303 refer to the description of the relevant steps in the above-mentioned embodiment of the method, which will not be repeated here.

The embodiment of the present disclosure also provides a computer-readable storage medium, where a computer program is stored on the computer-readable storage medium, and the computer program includes program instructions. The method implemented when the program instructions are executed can refer to the above method.

The computer-readable storage medium may be an internal storage unit of the electronic device described in the above embodiments, such as a hard disk or a memory of the electronic device. The computer-readable storage medium can also be an external storage device of the electronic device, such as a plug-in hard disk equipped on the electronic device, a SMC, a secure digital (Secure Digital, SD) card, or a Flash Card, etc.

Further, the computer-readable storage medium may mainly include a program storage area and a data storage area, wherein the program storage area may store an operating system, an application program required by at least one function, etc. The storage data area can store data created according to the use of the electronic device.

The electronic device and the computer-readable storage medium provided by the above embodiments can preliminarily determine that there may be abnormal lane lines among the lane lines recognized by the lane line recognition results by performing length detection on the lane lines recognized by the lane line recognition results; and mark the first lane line after performing the length detection to determine the lane spacing area; based on the lane spacing area, further determine the abnormal lane lines in the lane lines recognized by the lane line recognition results, and determines that there may be the abnormal lane lines in the lane line recognition results as much as possible. Therefore, the accuracy of lane line detection is improved, and the safety of vehicle driving is further improved.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description only represents some embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for recognizing anomalous lane line comprising:
    obtaining lane line recognition results of lane line images;
    determining lane lines in the lane line images according to the lane line recognition results;
    determining one of the lane lines having a length greater than a first length threshold and having a straight line from the lane lines as the first lane line;
    masking the first lane line and determining mark points of the first lane;
    determining marking lines according to the mark points and the first lane line, comprising: determining straight lines passing through the mark points and perpendicular to the first lane line as the marking lines, and both ends of each of the marking lines intersecting with two sides of one of the lane line images respectively;
    dividing each of the lane line images into areas according to the marking lines and the first lane line and obtaining a lane spacing area from the areas; and
    determining the lane lines in the lane spacing area of the lane line recognition results as abnormal lane lines.

2. The method as recited in claim 1, wherein dividing each of the lane line images according to the marking lines and the first lane line and obtaining the lane spacing area from the areas, comprises:
    determining a second lane line corresponding to the first lane line according to the marking line; and
    determining an area between the first lane line and the second lane line in each of the lane line images as the lane spacing area.

3. The method as recited in claim 2, wherein determining the second lane line corresponding to the first lane line according to the marking line, comprises:
    determining one lane line intersecting the marking lines and adjacent to the first lane line as the second lane line corresponding to the first lane line.

4. The method as recited in claim 3, wherein determining the lane line intersecting the marking lines and adjacent to the first lane line as the second lane line corresponding to the first lane line, comprises:
  when the lane line intersects the marking lines and is adjacent to the first lane line, determining a length of the lane line;
  when the length of the lane line is greater than a second length threshold, determining the lane line as the second lane line corresponding to the first lane line.

5. The method as recited in claim 3, wherein the second lane line is a lane line located at a target orientation of the first lane line.

6. The method as recited in claim 1, wherein masking the first lane line and determining the mark points of the first lane, comprises:
  marking the first lane line according to a target length interval, and determining the mark points.

7. The method as recited in claim 1, wherein determining one of the lane lines having the length greater than the first length threshold and having the straight line from the lane lines as the first lane line, comprises:
  determining one lane line having a length greater than the first length threshold and being the closest to a vehicle in the lane lines as the first lane line.

8. An electronic device comprising:
  a processor; and
  a non-transitory storage medium coupled to the processor and configured to store a plurality of instructions, which cause the processor to:
  obtain lane line recognition results of lane line images;
  determine lane lines in the lane line images according to the lane line recognition results;
  determine one of the lane lines having a length greater than a first length threshold and having a straight line from the lane lines as the first lane line;
  mask the first lane line and determine mark points of the first lane;
  determine marking lines according to the mark points and the first lane line, comprising: determining straight lines passing through the mark points and perpendicular to the first lane line as the marking lines, and both ends of each of the marking lines intersecting with two sides of one of the lane line images respectively;
  divide each of the lane line images into areas according to the marking lines and the first lane line and obtain a lane spacing area from the areas; and
  determine the lane lines in the lane spacing area of the lane line recognition results as abnormal lane lines.

9. The electronic device as recited in claim 8, wherein the plurality of instructions are further configured to cause the processor to:
  determine a second lane line corresponding to the first lane line according to the marking line; and
  determine an area between the first lane line and the second lane line in each of the lane line images as the lane spacing area.

10. The electronic device as recited in claim 9, wherein the plurality of instructions are further configured to cause the processor to:
  determine one lane line intersecting the marking lines and adjacent to the first lane line as the second lane line corresponding to the first lane line.

11. The electronic device as recited in claim 10, wherein the plurality of instructions are further configured to cause the processor to:
  when the lane line intersects the marking lines and is adjacent to the first lane line, determine a length of the lane line;
  when the length of the lane line is greater than a second length threshold, determine the lane line as the second lane line corresponding to the first lane line.

12. The electronic device as recited in claim 10, wherein the second lane line is a lane line located at a target orientation of the first lane line.

13. The electronic device as recited in claim 8, wherein the plurality of instructions are further configured to cause the processor to:
  mark the first lane line according to a target length interval, and determine the mark points.

14. The electronic device as recited in claim 8, wherein the plurality of instructions are further configured to cause the processor to:
  determine one lane line having a length greater than the first length threshold and being the closest to a vehicle in the lane lines as the first lane line.

15. A non-transitory storage medium having stored thereon instructions that, when executed by at least one processor of an electronic device, causes the least one processor to execute instructions of a method for recognizing anomalous lane line, the method comprising:
  obtaining lane line recognition results of lane line images;
  determining lane lines in the lane line images according to the lane line recognition results;
  determining one of the lane lines having a length greater than a first length threshold and having a straight line from the lane lines as the first lane line;
  masking the first lane line and determining mark points of the first lane;
  determining marking lines according to the mark points and the first lane line, comprising: determining straight lines passing through the mark points and perpendicular to the first lane line as the marking lines, and both ends of each of the marking lines intersecting with two sides of one of the lane line images respectively;
  dividing each of the lane line images into areas according to the marking lines and obtaining a lane spacing area from the areas; and
  determining the lane lines in the lane spacing area of the lane line recognition results as abnormal lane lines.

16. The non-transitory storage medium as recited in claim 15, wherein the method comprising:
  determining a second lane line corresponding to the first lane line according to the marking line; and
  determining an area between the first lane line and the second lane line in each of the lane line images as the lane spacing area.

17. The non-transitory storage medium as recited in claim 16, wherein determining the second lane line corresponding to the first lane line according to the marking line, comprises:
  determining one lane line intersecting the marking lines and adjacent to the first lane line as the second lane line corresponding to the first lane line.

18. The non-transitory storage medium as recited in claim 17, wherein determining the lane line intersecting the marking lines and adjacent to the first lane line as the second lane line corresponding to the first lane line, comprises:
  when the lane line intersects the marking lines and is adjacent to the first lane line, determining a length of the lane line;

when the length of the lane line is greater than a second length threshold, determining the lane line as the second lane line corresponding to the first lane line.

\* \* \* \* \*